United States Patent [19]

Lawsing

[11] 4,271,859
[45] Jun. 9, 1981

[54] TEMPERATURE SENSOR
[75] Inventor: Joseph W. Lawsing, Windsor Locks, Conn.
[73] Assignee: United Technologies Corporation, Hartford, Conn.
[21] Appl. No.: 97,584
[22] Filed: Nov. 26, 1979
[51] Int. Cl.³ .............................................. G05D 16/00
[52] U.S. Cl. ..................................... 137/85; 251/61.3
[58] Field of Search .................. 137/82, 85, 86, 84; 251/61.1, 61.2, 61.3, 61.4, 61.5

[56] References Cited
U.S. PATENT DOCUMENTS 3,163,981  1/1965  Goodall ............................ 137/82 X
3,169,402  2/1965  Baker ............................... 137/85 X Primary Examiner—Alan Cohan
Attorney, Agent, or Firm—Charles A. Warren

[57] ABSTRACT

A pressure or temperature sensor that translates a pressure or temperature signal into a hydraulic pressure signal. The sensor or transducer utilizes no bearings, levers or pivots that would introduce errors and the control plate is supported within the casing only by bellows. The transducer has use in transmitting a hydraulic pressure signal to the fuel control in a gas turbine in response either to a pressure or temperature signal such as engine inlet temperature or compressor discharge pressure.

9 Claims, 2 Drawing Figures

4,271,859

TEMPERATURE SENSOR

BACKGROUND OF THE INVENTION

This type of device has generally been relatively heavy and utilized bearings, links, pivots and/or seals, all of which could introduce errors in the accuracy of the device and would provide chances for failure. One of this type of device also required the bleeding of air through the device and this in many instances could contaminate the mechanism and affect performance.

SUMMARY OF THE INVENTION

A feature of the invention is a bellows assembly directly connected to and actuating a floating nozzle element making the device free of levers, links and/or friction causing elements. Another feature is a simplified arrangement for adjustment for the device. Another feature is the support of the control plate solely by actuating bellows.

According to the invention, a valve element is supported between two bellows and this valve element moves with respect to a valve plate thereby to control the flow of a hydraulic fluid through the device. The two bellows sense the fluid pressure on opposite sides of the valve plate and a gas sensitive bellows also secured to said element is exposed to gaseous pressure from the temperature or pressure sensing device. This gas sensitive bellows also acts to move the valve element with respect to the plate thereby providing a hydraulic pressure proportional to the temperature or pressure being sensed by the device. The only support for the valve element is the bellows.

The foregoing and other objects, features and advantages of the present invention will become more apparent in the light of the following detailed description of preferred embodiments thereof.

DESCRIPTION OF THE PREFERRED EMBODIMENT

Figure 1:
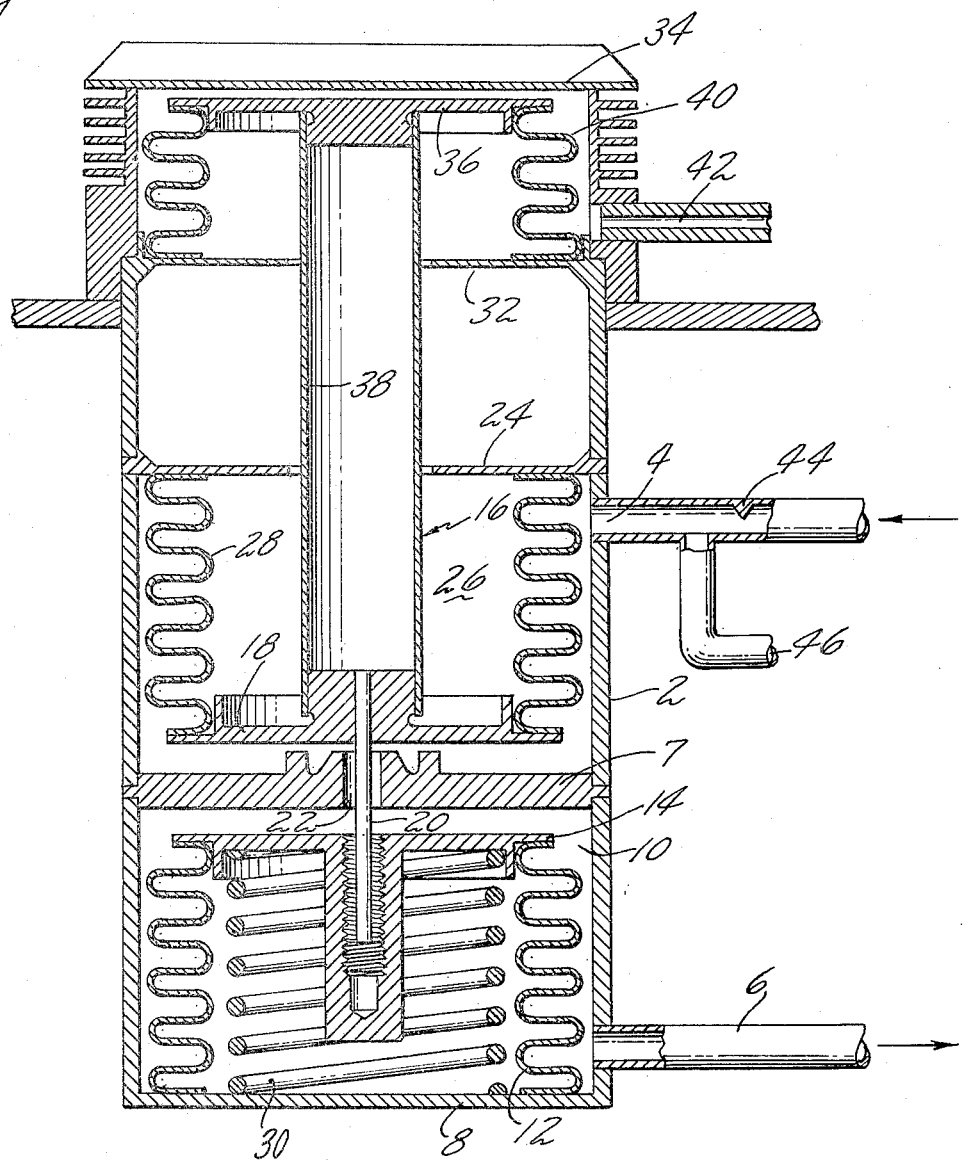
FIG. 1 is a sectional view through one form of the device of the invention.

Referring first to FIG. 1, a casing 2 is generally cylindrical and has axially spaced inlet and outlet openings 4 and 6 located at opposite sides of a valve plate 7 extending across and fixed within the casing between opposite ends.

The outlet 6 is located adjacent to one end cap 8 of the casing and this end cap 8 establishes between it and the valve plate 7 a chamber 10 in which is positioned a bellows 12, one end of which is attached to the end cap 8, and the other end of which engages a disk 14 forming part of a valve element 16, the latter being axially movable within the casing.

The valve element 16 includes in addition to the disk 14 a similar disk 18 located on the side of the plate 7 opposite to the disk 14 and connected to the disk 14 by a rod 20 extending through a central opening 22 in the valve plate.

The inlet 4 is located between the valve plate 7 and an inwardly extending flange 24 on the casing, this flange defining with the plate 7 a chamber 26. A bellows 28 within the chamber 26 extends from the flange 24 to the disk 18 and the opposite ends of the bellows are connected respectively to the flange and disk.

Hydraulic fluid which may be engine fuel if the device is used in connection with a gas turbine, enters the inlet and surrounds the bellows 28. This fluid flows into the space between the disk 18 and the valve plate 7, passes through the opening 22 in said plate and vents into the space surrounding the bellows 12 to be discharged through the outlet 6. A spring 30 positioned within the bellows 12 extends from the casing end 8 to the disk 14 and biases the valve element in an upward direction toward the inlet 4.

Positioned above the inwardly extending flange 24 is another similar flange 32 and above this flange and between the end cap 34 on the casing is a third disk 36 forming part of the valve element 16 and connected to the remainder of the element by a sleeve 38. A bellows 40 extending between the disk 36 and the flange 32 with its ends secured to said disk and flange is subjected on its outer surface to a gas pressure entering a gas pressure inlet 42. This inlet is connected either to a temperature probe of conventional construction which registers temperature as a change in the pressure in the inlet 42 or the inlet may be connected directly to a pressure sensing element if the device is used for measuring pressures. As the pressure increases in the gas inlet 42, the valve element 36 is moved downwardly by the pressure acting on the bellows 40 and on the upper side of the disk 36, thereby permitting an decreased flow of hydraulic fluid through the opening 22 and increasing the pressure at the inlet in proportion to the pressure increase in the gas inlet 42. This pressure increase may be used directly in the fuel control of the gas turbine engine for adjusting a flow of fuel or other adjustment that is appropriate. It will be understood that the inlet fluid is metered as by a restriction 44 and a reduction in flow through the opening 22 will result in an increasing inlet pressure. This pressure may be transmitted to the device to be controlled by a duct 46 downstream of the restriction 44.

The space within the three bellows is evacuated and this will obviously include the space between the two inwardly extending flanges 24 and 32, the inlet peripheries of which are spaced from the tube 38 as shown. It will be clear that the movable valve element is free to move axially within the casing without friction in any way since the element is supported only by the three bellows. Thus the device is more accurate because there is no possibility for a frictional drag on the device to introduce errors. Also there is no necessity for any links or levers to transfer the pressure signal from the gas inlet 42 to a pressure change in the hydraulic fluid.

It will be apparent that the inlet pressure acts on the bottom side of disk 18 and the outlet drain pressure acts on the top side of the disk 14. These pressures oppose each other and are balanced by the gas inlet pressure acting on the disk 36 and by the pressure of spring 30 during steady state conditions. When the gas inlet pressure increases, this pressure moves the valve element 16 downwardly until the pressures balance again thereby producing an increase in pressure of the hydraulic fluid of the inlet 4. With the arrangement shown, the different temperature of the gas bellows and the hydraulic bellows are insulated by the vacuum within and between the bellows and radiant heat transfer is avoided by the inwardly extending flanges 24 and 32 that extend almost to the tube 38 and prevent radiation between the several bellows.

Figure 2:
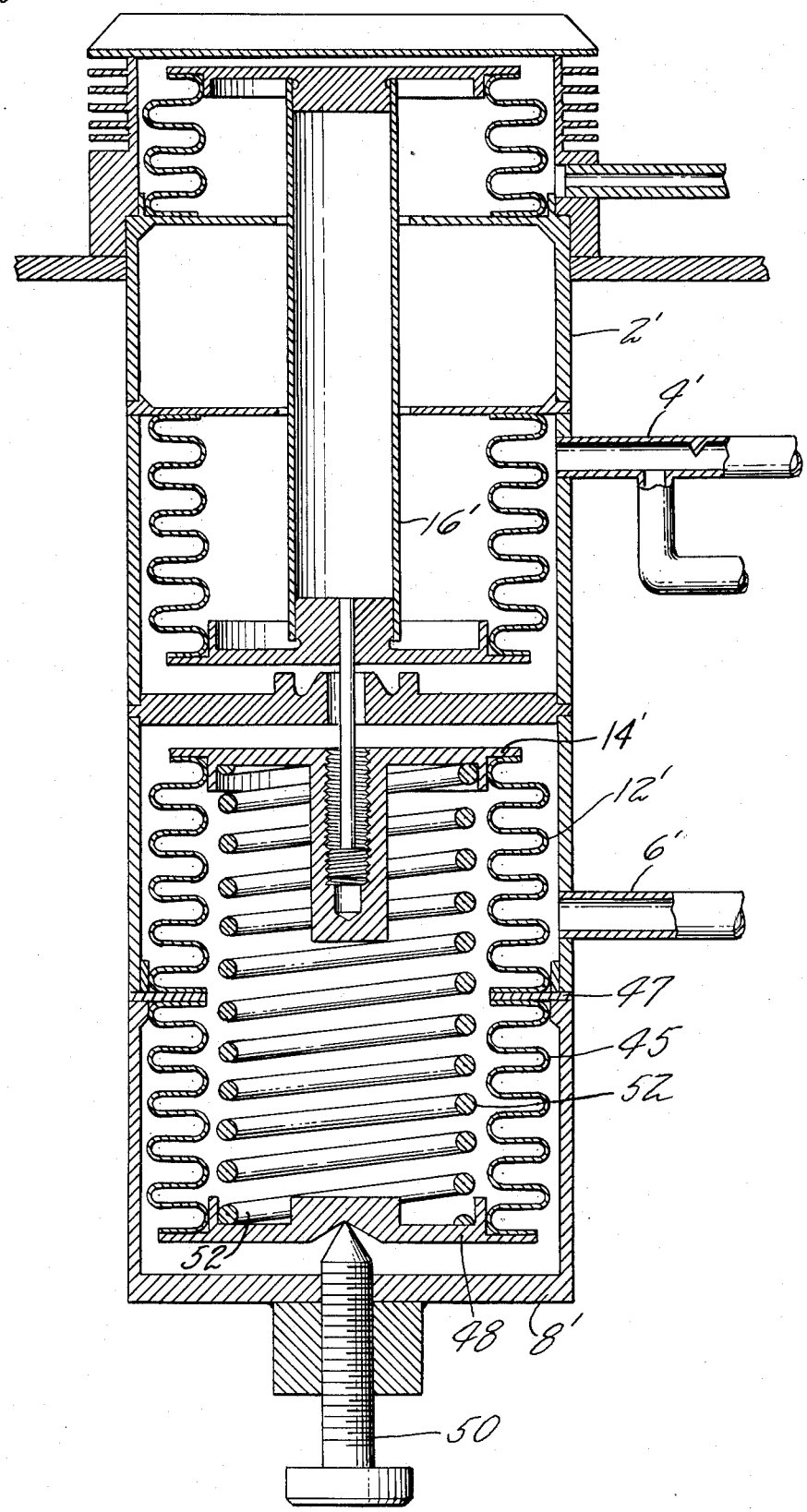
FIG. 2 is a modified form of the device.

The device of FIG. 2 is similar to FIG. 1 in that the casing 2' has the same hydraulic inlet 4' and outlet 6' except that the outlet 6' is spaced from the end cap 8' to permit the interposition of an additional bellows 45 between an inwardly extending flange 47 with which the bottom end of the bellows 12' engages and a disk 48 supported on an adjusting screw 50 extending through the end cap 8'. A spring 52 extends between the plate 48 and the disk 14' which acts in general the same way the spring 30 does in FIG. 1. This arrangement has the added feature, however, that by adjustment of the set screw 50 the pressure of the spring 52 acting on the valve element 16' may be adjusted thereby adjusting the relationship of the hydraulic pressures to the gas pressure. In this device the space on both sides of the bellows 45 would be evacuated. In other respects the device of FIG. 2 functions in the same way as the device of FIG. 1.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. A pressure transducer including:
   a casing having a hydraulic fluid inlet and outlet and a gas pressure inlet;
   a valve plate in said casing between said fluid inlet and outlet and having a fluid passage therein;
   a movable valve element in said casing cooperating with said plate to control the flow of fluid therethrough;
   a pair of bellows each secured at one end to and supporting said element with one bellows on each side of the plate and responsive to the fluid pressures on opposite sides of the plate;
   a second plate in said casing in parallel spaced relation to said valve plate and having an opening thereon through which a portion of the valve element extends; and
   a gas sensitive bellows also secured to said element and exposed to gas pressure from said gas inlet said gas bellows being located on the side of the second plate remote from the valve plate and the pair of bellows.

2. A pressure transducer as in claim 1 in which the element has two disks thereon, one on each side of the plate with which said pair of bellows engage and with a mechanical connection between said disks.

3. A pressure transducer as in claim 2 in which the mechanical connection extends through the passage in the plate.

4. A pressure transducer as in claim 1 in which each of the pair of bellows is secured at one end to the casing and at the other end to the valve element.

5. A pressure transducer as in claim 1 in which a spring is positioned between the valve element and the casing in concentric relation to one of said pair of bellows.

6. A pressure transducer as in claim 1 in which the fluid pressure acts on the outsides of the pair of bellows and the insides are evacuated.

7. A pressure transducer as in claim 1 in which the gas responsive bellows is connected at one end to the second plate and at the other to the element.

8. A pressure transducer as in claim 2 in which the element has a third disk to which one end of the gas sensitive bellows is attached.

9. A pressure transducer as in claim 2 in which the casing has a chamber in alignment with said pair of bellows, another bellows in said chamber with one end secured to the casing and the other having a cap thereon, said another bellows being in alignment with and communicating with one of said pair of bellows, a spring extending between said cap and the disc to which said one of said bellows is attached and an adjusting screw extending through the casing and engaging said end cap.

* * * * *